(12) United States Patent
Jensen

(10) Patent No.: US 6,457,283 B1
(45) Date of Patent: Oct. 1, 2002

(54) APPARATUS FOR DETERRING FLYING ANIMALS AND METHOD FOR MAKING THE SAME

(76) Inventor: Gary I. Jensen, 10635 NE. 123rd St., Kirkland, WA (US) 98034

(*) Notice: Subject to any disclaimer, the term of this patent is extended or adjusted under 35 U.S.C. 154(b) by 0 days.

(21) Appl. No.: 09/597,656

(22) Filed: Jun. 19, 2000

(51) Int. Cl.[7] ................................................. E04H 9/16
(52) U.S. Cl. .................... 52/101; 43/1; 43/58; 43/26.1; 428/136; 428/577
(58) Field of Search ............... 52/101, 517, 309.4; 119/903; 43/58, 11; 403/219; 72/324

(56) References Cited

U.S. PATENT DOCUMENTS

| | | | | |
|---|---|---|---|---|
| 2,258,803 A | * | 10/1941 | Peles | 20/1 |
| 2,938,244 A | * | 5/1960 | Christensen | 20/1 |
| 3,191,239 A | * | 6/1965 | Moore et al. | 20/1 |
| 4,962,619 A | * | 10/1990 | Chatten | 52/101 |
| 5,181,338 A | * | 1/1993 | Chatten | 43/58 |
| 5,691,032 A | * | 11/1997 | Trueblood et al. | 428/136 |

* cited by examiner

Primary Examiner—Carl D. Friedman
Assistant Examiner—Basil Katcheves
(74) Attorney, Agent, or Firm—Robert M. Storwick

(57) ABSTRACT

An apparatus for deterring flying animals and method for making the same. The apparatus is made from a planar base plate in which one or more tangs are formed. A wire is removably attached to at least one of the tangs, the wire having a first portion that has a component that is not planar with the base plate and a second portion that can be captured by the tang. The first and second portions of the wire are attached at one end of the second portion. The wire can also have a third portion, also attached to the second portion, at the other end of the second portion. The tangs in the base plate can be linear, zigzag, or have any other configuration. If the tangs have a zigzag configuration, the base plate is preferably sinuous. The third portion of the wire can have three subportions, although the third portion is coplanar. The three subportions are at angles to one another.

10 Claims, 2 Drawing Sheets

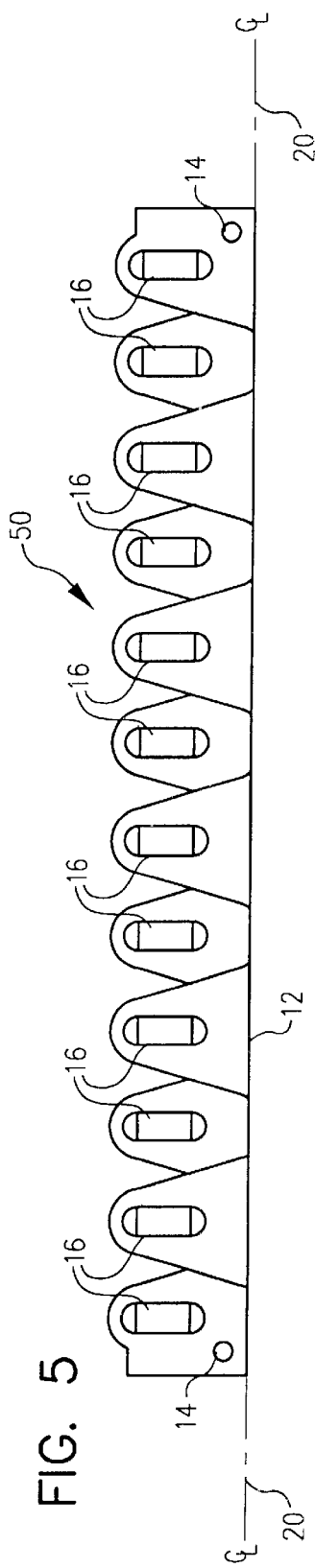
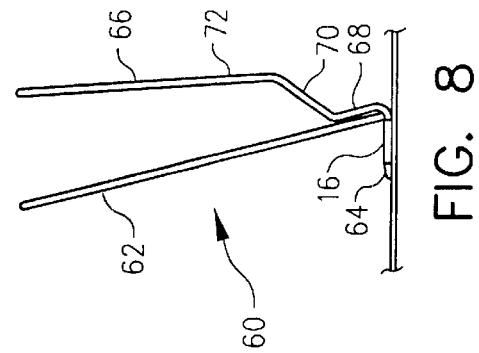
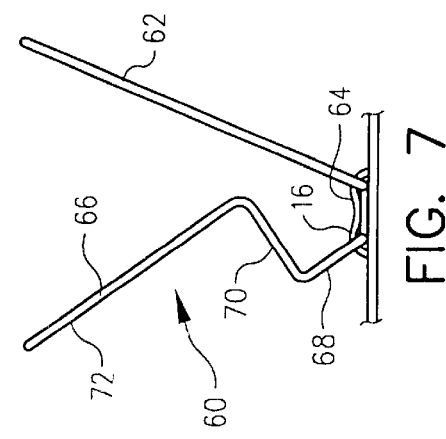
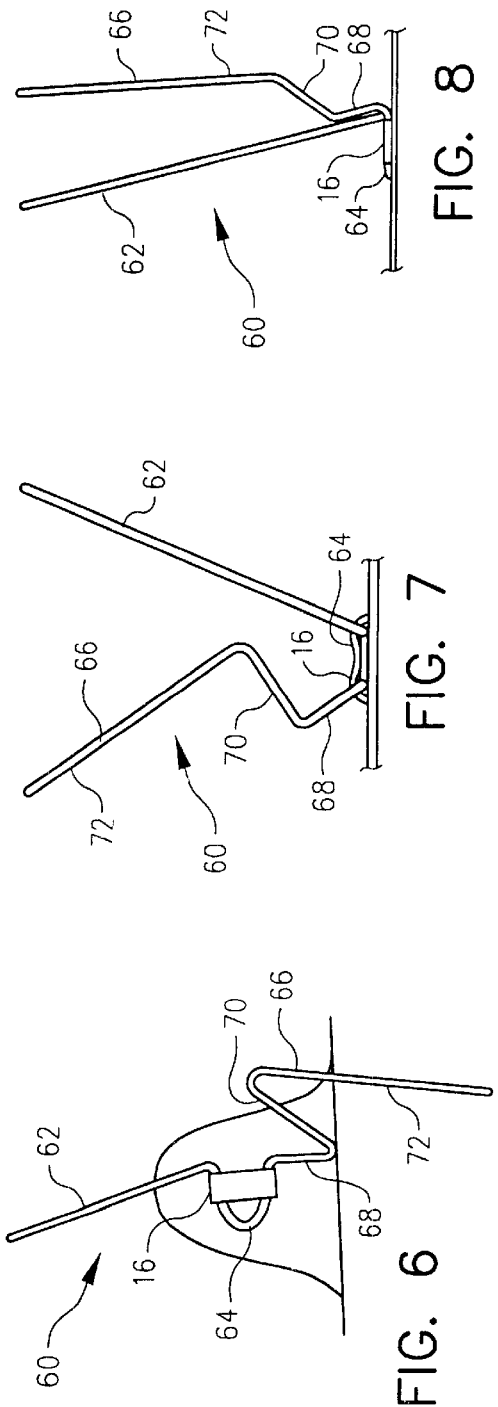

APPARATUS FOR DETERRING FLYING ANIMALS AND METHOD FOR MAKING THE SAME

TECHNICAL FIELD

The present invention relates to a deterrent apparatus, and more particularly, to an apparatus for deterring flying animals and a method for making the same.

BACKGROUND OF THE INVENTION

Many inventions have been made to deter birds from landing and/or roosting on buildings or other structures. Some such inventions feature arrays of surfaces that either create optical effects to prevent birds from landing and/or roosting, or physically interfere with birds landing and/or roosting. For example, U.S. Pat. No. 4,269,008 discloses a series of closely spaced, upwardly extending structures surmounted with pyramids which create a prism effect to optically frighten birds.

The inventions that use physical interference to interfere with birds landing and/or roosting fall into two classes. The first class includes those inventions that have relatively large, visible, features that disrupt a bird's attempts to land and/or roost. The second class includes those inventions that include wire or other relatively invisible features that either disrupt a bird's attempts to land and/or roost or cooperatively create a visual effect that disrupts a bird's attempts to land and/or roost.

Inventions in the first class include that disclosed in U.S. Pat. No. 4,359,844, which shows a triangular structure that is fixed to a crossbar on an electrical power pole to prevents birds from landing and accidentally electrocuting themselves by touching adjacent power lines supported by the crossbar. Also in the first class are the inventions disclosed in U.S. Pat. Nos. 4,997,721 and 5,691,032, which both feature fingers cut from a continuous base strip, the fingers then being bent upwardly from the base strip, the ends of the fingers having one or more sharp projections to deter birds. U.S. Pat. No. 5,058,335 discloses an array of flexible plastic fingers that can be attached to a wires or cable-like structure such that the fingers will bend downward should a bird attempt to land on the fingers, thereby discouraging the bird from landing. U.S. Pat. No. 5,253,444 discloses a structure intended for placement on a sill, the structure including at least one prong holder attached to a top member that is attached to a base member, each of the top members having pointed prongs projecting therefrom. The disclosure of U.S. Pat. No. 5,497,585 shows a spring-loaded cable having a plurality of rotatable rings that make it difficult for a bird to land stably.

Inventions in the second class include the disclosure of U.S. Pat. No. 4,937,988, which shows a pair of support brackets which allow a plurality of monofilament wires to be secured therebetween, thereby discouraging birds from landing between the support brackets. The disclosure of U.S. Pat. No. 4,962,619 shows a helix of wire attached to an elongate strip by means of flaps punched in the strip, the flaps being periodically bent back over the wire helix to hold it in place. U.S. Pat. No. 5,167,099 discloses a plurality of comb-like members that are supported above an upwardly-facing horizontal surface such that a line having knots near its ends can be passed between adjacent teeth of the comb-like structures and from one comb-like member to another, with the knots holding the line in place. The disclosure of U.S. Pat. No. 5,181,338 shows a vertically-oriented flange attached to a horizontal base for attachment to a horizontal surface, the flange including a number of perforations and having a plurality of projecting wires attached thereto, the projecting wires being aligned in a coplanar fashion and each of the projecting wires being too weak to support a bird attempting to land. U.S. Pat. No. 5,400,552 discloses a preventative device that includes a base to which spikes are force fitted, the spikes being made from wire and having a flattened protuberance near one end, the flattened portion fitting into circular canals in the base, the protuberance being larger than the diameter of the circular canals. U.S. Pat. No. 5,873,324 discloses an electrically insulative protector adapted for placement over a power wire, the protector having arms extending in opposite directions away from a connecting structure, each of the arms having apertures adapted to allow attachment of wires of different dimensions. U.S. Pat. No. D357,771 discloses a wire array for placement over a wire or cable on which birds prefer to alight, the wire array having upwardly-projecting tipped wires, the tipped wires extending below the point where the wire array is placed on the wire or cable.

Each of the inventions disclosed in the above-mentioned patents is complicated to build or repair. Furthermore, it is generally acknowledged that wires are most effective in deterring flying animals from alighting and roosting. Therefore, it is desirable to have a bird deterrent structure that is easy to build and repair.

SUMMARY OF THE INVENTION

According to one aspect, the invention is an apparatus for deterring flying animals. The apparatus includes a base plate and a first piece of wire. There is at least one bendable tang formed in the base plate. The first piece of wire has first and second segments connected together. The first segment is generally pointing upwardly and the second segment is generally horizontal. The second segment is placed on the base plate and under the bendable tang, which is bent over the second segment of the first piece of wire so that the first piece of wire is removably attached to the base plate.

According to a second aspect, the invention is a method for making an apparatus for deterring flying animals. The method includes the steps of a) forming a base plate, and b) forming at least one bendable tang in the base plate. The inventive method further includes the steps of c) forming a first piece of wire, and d) bending the first piece of wire so that it has its first and second segments connected together. The first and second segments are straight but at an angle relative to one another.

The method further includes the steps of e) placing the first piece of wire on the base plate so that the first segment is generally pointing upwardly and the second segment is generally horizontal and placed on the base plate and under the bendable tang, and f) bending the bendable tang over the second segment of the first piece of wire so that the first piece of wire is removably attached to the base plate.

According to a third aspect, the invention is an apparatus for making an apparatus for deterring flying animals. The apparatus includes means for forming a base plate, means for forming at least one bendable tang in the base plate. The apparatus further includes means for forming a first piece of wire, and means for bending the first piece of wire so that it has first and second segments connected together. The first and second segments are straight but at an angle relative to one another.

The apparatus further includes means for placing the first piece of wire on the base plate so that the first segment is generally pointing upwardly and the second segment is generally horizontal and the second segment is placed on the base plate and under the bendable tang, and means for bending the bendable tang over the second segment of the first piece of wire so that the first piece off wire is removably attached to the base plate.

BRIEF DESCRIPTION OF THE DRAWINGS

FIG. 5 is a plan view of a second embodiment of the invention.

FIG. 6 is a plan view of a portion of the second embodiment of the invention, showing a wire attached to the segment.

FIG. 7 is an elevation view of the portion of the second embodiment of the invention, showing the wire attached to the segment, and taken along the longitudinal axis of the plurality of the tangs.

FIG. 8 is an elevation view of the portion of the second embodiment of the invention, showing the wire attached to the segment, and taken along the longitudinal axis of the tang to which the wire is attached.

DETAILED DESCRIPTION OF THE PREFERRED EMBODIMENT OF THE INVENTION

Figure 1:
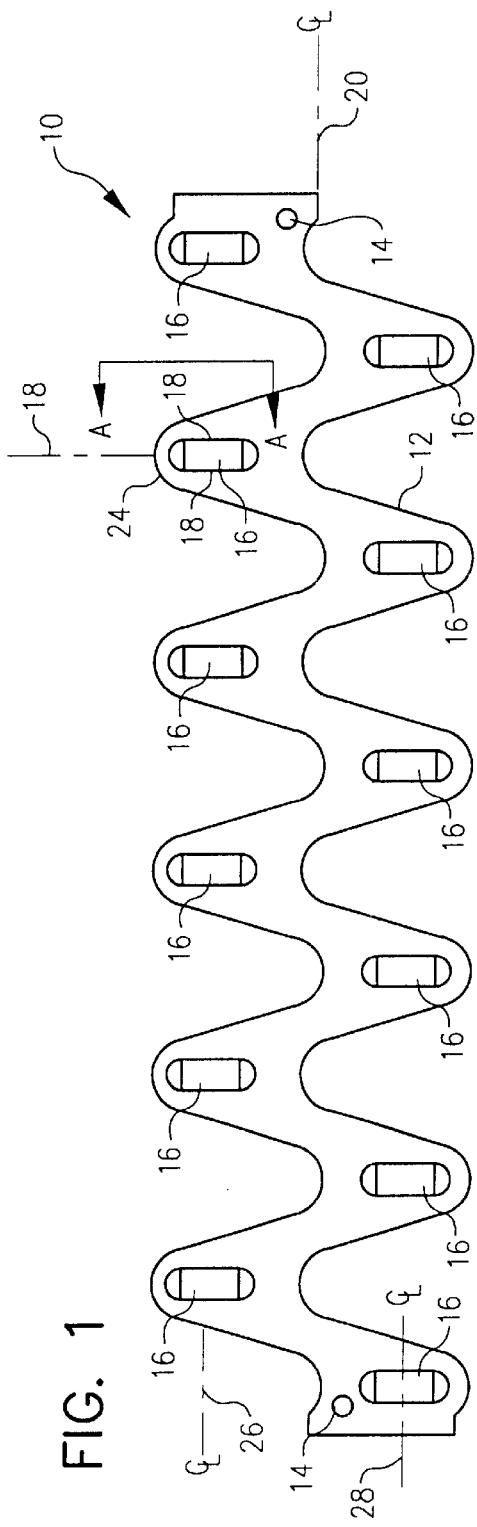
FIG. 1 is a plan view of a first embodiment of the invention.

FIG. 1 is a plan view of a first embodiment of the invention. The apparatus 10 includes a base plate 12 and a plurality of wires. The base plate 12 is generally made from an appropriate metal, although any suitable material can be used. In the preferred embodiment, the base plate 12 is approximately 12 inches long, although as many copies of the base plate 12 can be strung together to protect any desired length from alighting and/or roosting birds. Each copy of the base plate 12 can be attached to a surface to be protected (generally a horizontal surface by means of an adhesive or by means of nails or screws that are driven or screwed through the holes 14. The base plate 12 has at least one tang 16 formed therein. Each of the tangs 16 is bendable.

Figure 2:
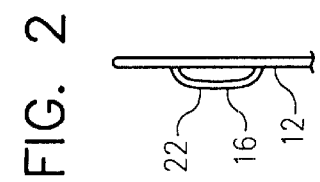
FIG. 2 is a cross-sectional view of the first embodiment taken along the lines A—A shown in FIG. 1.

FIG. 2 is a cross-sectional view of the first embodiment taken along the lines A—A shown in FIG. 1, and showing a tang 16. The tang 16 is formed by creating slits 18 (FIG. 1, near lines A—A) around a portion of the base plate 12 and forcing the portion of the base plate 12 slightly above the remainder of the base plate 12. Alternatively, the tang 16 can be formed by creating a U-shaped slit around a portion of the base plate 12 and forcing the portion of the base plate 12 slightly above the remainder of the base plate 12. The U-shaped slits can be formed so that the tangs 16 are parallel or antiparallel to one another. In one preferred embodiment the tang 16 has an axis of symmetry 18 which is aligned perpendicularly to an axis of symmetry 20 of the base plate 12. The tang 16 can be formed by a die that is approximately 0.756 inch in the direction of the axis 18 and approximately 0.286 inch perpendicular to the direction of the axis 18. The die can be used with a punch that is approximately 0.480 inch in the direction of the axis 18 and approximately 0.281 inch perpendicular to the direction of the axis 18. This combination of die and punch can create a tang 16 that is approximately 0.052 inch above the surface of the base plate 12 and having a flat portion 22 that is approximately 0.480 inch long in the direction of the axis 18.

The base plate 12 can have a number of forms. As shown in FIG. 1, the base plate can have a sinuous form, with a crest-to-crest dimension of approximately 2 inches. This causes a tang to be located approximately every inch along the axis 20. The tangs are staggered in accordance with the sinuous form. The sinuous form of the base plate 12 can be chosen to have a peak-to-peak dimension of approximately 2-¾ inches transversely to the axis 20. If desired, the rounded portion 24 of each of the sinuous curves forming the base plate 12 can have a radius of approximately 0.3125 inch.

In the first preferred embodiment, the tangs 16 fall into two groups: one group on one side of the axis 20 and the other group on the other side of the axis 20. The tangs 16 in each of the two groups are aligned along displaced axes 26 and 28, which are parallel to and respectively displaced to either side of the axis 20. The tangs 16 in each of the two groups can be parallel or antiparallel to one another. Preferably the tangs 16 are arranged in a zigzag array, although other arrays of the tangs 16 are also possible. If the tangs 16 are arranged in a zigzag array, each of the tangs 16 is preferably located at a bend of a sinuous shape.

Figure 4:
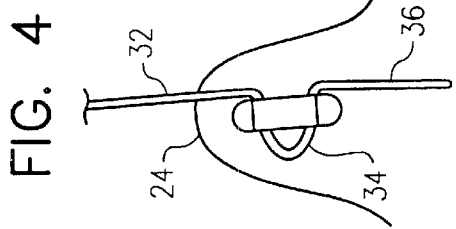
FIG. 4 is a plan view of a portion of the first embodiment, showing the wires installed.
Figure 3:
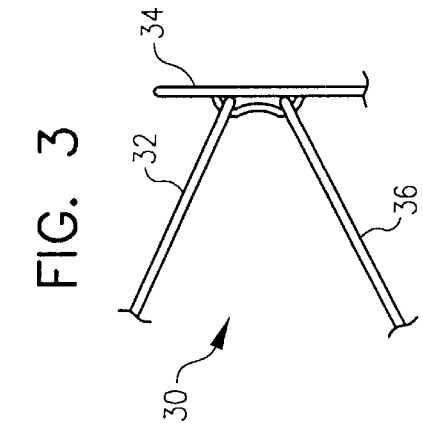
FIG. 3 is across-sectional view of the first embodiment taken along the lines A—A shown in FIG. 1 and showing a wire attached thereto.

FIG. 3 is a cross-sectional view of the first embodiment taken along the lines A—A shown in FIG. 1 and showing a wire attached thereto. FIG. 4 is a plan view of a portion of the first embodiment, showing the wires installed. The wire 30 has a first segment 32 and a second segment 34. The first and second segments 32 and 34 are preferably coplanar. The first segment 32 is attached to one end of the second segment 34. The first segment 32 generally extends above the base plate 12. If the base plate 12 is horizontal, the direction of the first segment 32 has a vertical component. The second segment 34 is generally in the plane of the base plate 12. Typically the angle between the first segment 32 and the plane of the base plate 12 is in the range between 45 and 90 degrees.

The wire 30 can also include a third segment 36. The first, second and third segments 32, 34, and 36 are preferably coplanar. The third segment 36 is attached to the other end of the second segment 34. The third segment 34 also generally extends above the base plate 12. If the base plate 12 is horizontal, the direction of the third segment 34 has a vertical component. Typically the angle between the third segment 34 and the plane of the base plate is in the range between 45 and 90 degrees.

FIG. 5 is a plan view of a second embodiment of the invention. The second embodiment of the invention can be created by folding the first embodiment longitudinally along the axis 20 shown in FIG. 1. This embodiment of the apparatus 50 is useful when it is desired to attach the invention to a narrow ledge.

Generally, it is desirable to use only half of the tangs 16 in the second embodiment of the apparatus 50. It is also desirable to have the wire(s) attached to the tang(s) extend in both directions relative to the axis 20, although it is possible to use all of the tangs, each tang having a wire extending in only one direction relative to the axis 20.

FIG. 6 is a plan view of a portion of the second embodiment of the invention, showing a wire attached to the segment. FIG. 7 is an elevation view of the portion of the second embodiment of the invention, showing the wire attached to the segment, and taken along the longitudinal axis of the plurality of the tangs. FIG. 8 is an elevation view of the portion of the second embodiment of the invention, showing the wire attached to the segment, and taken along the longitudinal axis of the tang to which the wire is attached. The wire 60 has a first segment 62, a second segment 64, and a third segment 66. The three segments 62, 64 and 66 are coplanar. The first segment 62 is straight, and attached to one end of the second segment 64. The first segment 62 generally extends above the base plate 12. If the base plate 12 is horizontal, the direction of the first segment 62 has a vertical component The second segment 64 is generally in the plane of the base plate 12. Typically the angle between the first segment 62 and the plane of the base plate 12 is in the range between 45 and 90 degrees.

The third segment 66 of the wire 60 is attached to the other end of the second segment 64. The third segment 64 also generally extends above the base plate 12. If the base plate 12 is horizontal, the direction of the third segment 64 has a vertical component. The third segment 66 itself has three segments. Lower segment 68 attaches to the second end of the second segment 64. A middle segment 70 is attached to the lower segment 68, and placed at an angle relative to the lower segment 68. An upper segment 72 is attached to the middle segment 70, and placed at an angle relative to the middle segment 70. Typically the angle between the upper segment 72 and the plane of the base plate is in the range between 45 and 90 degrees.

In accordance with the present invention, it is possible to easily repair any of the wires of the apparatus by bending the tang holding the wire away from the wire, replacing the wire, and bending the tang back to the position in which it holds the wire.

While the foregoing is a detailed description of the preferred embodiment of the invention, there are many alternative embodiments of the invention that would occur to those skilled in the art and which are within the scope of the present invention. Accordingly, the present invention is to be determined by the following claims.

What is claimed is:

1. An apparatus for deterring flying animals, comprising
   a base plate having at least one bendable tang formed therein, each tang being formed by creating two slits in a portion of the base plate and displacing the portion of the base plate between the two slits slightly above the remainder of the base plate; and
   a first piece of wire having first and second segments connected together, the first segment generally pointing upwardly and the second segment being generally horizontal, the second segment being placed on the base plate and under the bendable tang, the bendable tang being bent over the second segment of the first piece of wire so that the first piece of wire is attached to the base plate.

2. The apparatus of claim 1, wherein the first piece of wire further has a third segment, the third segment generally pointing upwardly, the first segment being connected to the second segment at one end thereof and the third segment being connected to the second segment at the other end thereof.

3. The apparatus of claim 1, wherein the angle between the second segment and the first segment and the angle between the second segment and the third segment are both between 45 and 90 degrees.

4. The apparatus of claim 1, wherein the first, second, and third segments of the first piece of wire are all coplanar.

5. The apparatus of claim 1, further including a plurality of additional pieces of wire, substantially identical to the first piece of wire.

6. The apparatus of claim 7, wherein the base plate includes a plurality of tangs.

7. The apparatus of claim 6, wherein the tangs are arranged in a linear array.

8. The apparatus of claim 6, wherein the tangs are arranged in a zigzag array.

9. The apparatus of claim 8, wherein the base plate has a sinuous shape.

10. The apparatus of claim 9, wherein each of the tangs is located at a bend of the sinuous shape.

* * * * *